(12) United States Patent
Kabuo (10) Patent No.: US 6,169,968 B1
(45) Date of Patent: Jan. 2, 2001

(54) APPARATUS AND METHOD FOR ESTIMATING PERFORMANCE INTEGRATED CIRCUIT

(75) Inventor: Chie Kabuo, Kyoto (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/111,883

(22) Filed: Jul. 8, 1998

(30) Foreign Application Priority Data

Jul. 9, 1997 (JP) .................................................. 9-184221

(51) Int. Cl.⁷ ..................................................... G06F 17/50
(52) U.S. Cl. ............................... 703/14; 703/19; 703/20; 716/10; 716/18
(58) Field of Search ................................. 703/14, 19, 20; 716/10, 17, 18

(56) References Cited

U.S. PATENT DOCUMENTS

| | | | |
|---|---|---|---|
| 5,870,308 | * 2/1999 | Dangelo et al. | 716/18 |
| 5,930,147 | * 7/1999 | Takei | 716/18 |
| 6,026,228 | * 2/2000 | Imai et al. | 716/18 |

FOREIGN PATENT DOCUMENTS

| | | |
|---|---|---|
| 7-28877 | 1/1995 | (JP) . |
| 07160748 | 5/1995 | (JP) . |
| 10-134093 | 5/1998 | (JP) . |
| 10-187783 | 7/1998 | (JP) . |

OTHER PUBLICATIONS

Noji et al., "Design and Implementation of Synthesis Prediction in RTL Design", The Transactions of the Institute of Electronics, Information and Communication Engineers D–I, vol. J78–D–I No. 7, Jul. 1995.

Ohm et al., "A Comprehensive Estimation Technique for High–Level Synthesis", Proceedings of the Eighth International Symposium on System Synthesis, 1995, pp. 122–127, Sep. 1995.*

Xu et al., "Layout–Driven RTL Binding Techniques for High–Level Synthesis Using Accurate Estimators", ACM Transactions on Design Automation of Electronic Systems, vol. 2, Issue 4, pp. 312–343, Oct. 1997.*

Lakshminarayana et al., "Synthesis of Power–Optimized and Area Optimized CIrcuits from Hierachical Behavioral Descriptions", Proc. Design Automation Conf. 1998, pp. 439–444, Jun. 1998.*

Maturana et al., "Incas: A Cycle Accurate Model of UltraS-PARC", Proc. 1995 IEEE Inter. Conf. Computer Design: VLSI in Computers and Processors., pp. 130–135, Oct. 1995.*

* cited by examiner

Primary Examiner—Kevin J. Teska
Assistant Examiner—Douglas W. Sergent
(74) Attorney, Agent, or Firm—McDermott, Will & Emery (57) ABSTRACT

The invention provides an apparatus and a method for accurately and rapidly estimating a performance of an integrated circuit in the design at a register transfer level. A parsing member converts an HDL description of the integrated circuit at the register transfer level into a representation by using parse trees, and a parse tree allocation member allocates elements of the integrated circuit to respective nodes of the parse trees. A trade-off estimation member predicts a minimum area which can satisfy a timing constraint by applying estimation models stored in an estimation library to the respective elements of the integrated circuit represented by using connections between the elements, and by appropriately changing application of driver models stored in a driver library. A performance candidate list generation part generates, by changing the application of the driver models, a list of performance candidates each represented as a group of {area, delay, driving ability} with regard to each element on the path not satisfying the timing constraint. A performance candidate selection part selects a performance candidate which can satisfy the timing constraint and can minimize the area increase of the integrated circuit.

4 Claims, 11 Drawing Sheets

| Element | Area estimation model | Delay estimation model | Logic levels estimation model | |
|---|---|---|---|---|
| AND | Area vs Input signal number | Delay vs Input signal number, a, b->y | Logic levels vs Input signal number, a, b->y | ~21 |

Fig. 3

| Element | Area estimation model | Delay estimation model | Logic levels estimation model | |
|---|---|---|---|---|
| Multiplexer (s, a, b -> y) | Area vs Input bit width | Delay vs Input bit width, s->y, a, b->y | a->y:0 b->y:0 s->y:0 | ~22 |
| Adder (a, b -> y) | Area vs Input bit width | Delay vs Input bit width, a, b->y | Logic levels vs Input bit width, a, b->y | ~23 |
| | Area vs Input bit width | Delay vs Input bit width, a, b->y | Logic levels vs Input bit width, a, b->y | ~24 |

Fig. 4

|  | Driver A | Driver B | Driver C | Driver D | Driver E |
|---|---|---|---|---|---|
| Driving ability | 6.4 | 4.9 | 2.3 | 1.5 | 0.7 | ~30
| ΔArea | 0 | +5 | +6 | +7 | +8 | ~31
| ΔDelay | 0 | +0.20 | +0.19 | +0.21 | +0.24 | ~32
| ΔLogic levels | 0 | +1 | +1 | +1 | +1 | ~33
| Input capacitance | 0.007 | — | — | — | — | ~34

APPARATUS AND METHOD FOR ESTIMATING PERFORMANCE INTEGRATED CIRCUIT

BACKGROUND OF THE INVENTION

The present invention relates to apparatus and method for estimating a performance of an integrated circuit, in which a performance of an integrated circuit such as the area and the operation speed is estimated in the design at a register transfer level.

In accordance with the recent refinement of semiconductor manufacturing processes and the increased scale of integrated circuits, the design of integrated circuits has become more and more complicated, and correction after detailed design has become very difficult. As a result, the design time has been disadvantageously elongated due to iterations in the design.

Therefore, in order to prevent the elongation of the design time due to the iterations in the design, a design method, in which the performance of an integrated circuit is estimated at an early stage of the design, so that problems can be overcome before the detailed design on the basis of the estimation, has become considered to be significant.

As a conventional performance estimation method for an integrated circuit, a logical synthesis with a lowered optimizing ability is executed by a logical synthesizing tool.

Also, Japanese Laid-Open Patent Publication No. 7-160748 discloses an estimation method on the basis of a hardware description language (hereinafter referred to as the "HDL"). In this method, a description unit in the HDL is identified, so that a delay time and a circuit scale of each description unit can be calculated.

However, such conventional methods have the following problems:

First, the performance estimation using the logical synthesizing tool has a problem that it takes a long period of time ranging from several tens minutes to several hours.

Also, in the method disclosed in the Japanese Laid-Open Patent Publication No. 7-160748, in obtaining the circuit area and the delay time of an operator included in the input HDL, a circuit configuration for realizing the operator is not considered. Therefore, it is impossible to search a design space represented by area-delay trade-off that a small circuit area leads to a large delay time and a small delay time leads to a large circuit area. Accordingly, the performance resulting from the logical synthesis cannot be precisely estimated.

Moreover, in the latter method, merely the delay time of a logic part in the integrated circuit is obtained. Therefore, in design of deep submicron, in which a line delay time can largely affect the operation speed of the integrated circuit, an error in the performance estimation can be disadvantageously large.

SUMMARY OF THE INVENTION

According to the present invention, the area and the timing of an integrated circuit at a register transfer level are estimated in consideration of area-performance trade-off by using estimation models for estimating performances of respective elements representing the integrated circuit at the register transfer level and driver models of drivers affecting a delay time of a line.

Specifically, the apparatus of this invention for estimating a performance of an integrated circuit in design at a register transfer level comprises an estimation library for storing estimation models used for estimating performances of respective elements representing the integrated circuit at the register transfer level; a driver library for storing driver models of modeled relationships between driving abilities and areas of drivers for driving a line; and trade-off estimation means for estimating a performance of a target integrated circuit at the register transfer level represented by using connections between the elements which satisfies a predetermined constraint, by applying the estimation models stored in the estimation library to respective elements of the target integrated circuit and by changing application of the driver models stored in the driver library if necessary.

In this apparatus, the trade-off estimation means predicts the performance, which satisfies a predetermined constraint, of the integrated circuit at the register transfer level represented by using connections between the elements by applying the estimation models stored in the estimation library to the respective elements and by changing the application of the driver models stored in the driver library if necessary. Accordingly, the area and the timing attained after the logical synthesis of the integrated circuit can be precisely estimated in consideration of the trade-off. In addition, since there is no need to perform the logical synthesis, the estimation requires a shorter period of time than that by using a conventional apparatus.

Preferably, the apparatus for estimating a performance of an integrated circuit further comprises parse tree allocation means for converting a representation by using parse trees of the target integrated circuit into a representation by using the connections between the elements through allocation of the elements whose estimation models are stored in the estimation library to respective nodes of the parse trees, and for inputting the representation by using the connections between the elements to the trade-off estimation means. Still preferably, the apparatus for estimating a performance of an integrated circuit further comprises parsing means for converting a description by a hardware description language of the target integrated circuit into the representation by using the parse trees through parsing, and for inputting the representation by using the parse trees to the parse tree allocation means.

Furthermore, in the apparatus for estimating a performance of an integrated circuit, the target integrated circuit has a hierarchical structure, the apparatus preferably further comprises floor plan means for determining placement of modules and line paths between the modules in each hierarchy of the target integrated circuit, and the trade-off estimation means preferably predicts a performance of said target integrated circuit which satisfies a predetermined constraint in consideration of a line delay time between the modules estimated on the basis of the line paths determined by the floor plan means.

Alternatively, in the method of this invention of estimating a performance of an integrated circuit in design at a register transfer level, estimation models for estimating performances of respective elements representing the integrated circuit at the register transfer level and driver models of modeled relationships between driving abilities and areas of drivers for driving a line are used, and the method comprises a trade-off estimating step of estimating a performance of a target integrated circuit at the register transfer level represented by using connections between the elements which satisfies a predetermined constraint by applying the estimation models to respective elements of the target integrated circuit and by changing application of the driver models if necessary.

In this method, the performance, which satisfies a predetermined constraint, of the integrated circuit at the register transfer level represented by using the connections between the elements can be estimated by applying the estimation models for estimating the performances of the respective elements and by appropriately changing the application of the driver models. Accordingly, the area and the timing attained after the logical synthesis of the integrated circuit can be precisely estimated. In addition, since there is no need to perform the logical synthesis, the estimation requires a shorter period of time than that by a conventional method.

Preferably, the method of estimating a performance of an integrated circuit further comprises, as a prior step, a step of converting a representation by using parse trees of the target integrated circuit into a representation by using the connections between the elements through allocation of the elements whose estimation models are prepared to respective nodes of the parse trees. Still preferably, the method of estimating a performance of an integrated circuit further comprises, as a prior step, a step of converting a description by a hardware description language of the target integrated circuit into the representation by using the parse trees through parsing.

Preferably in the method of estimating a performance of an integrated circuit, the target integrated circuit has a hierarchical structure, and the method further comprises a floor plan step of determining placement of modules and line paths between the modules in each hierarchy in the target integrated circuit, and in the trade-off estimating step, a performance of the target integrated circuit which satisfies a predetermined constraint are estimated in consideration of a line delay time between the modules estimated on the basis of the line paths determined in the floor plan step.

DETAILED DESCRIPTION OF THE INVENTION

EMBODIMENT 1

Figure 1:
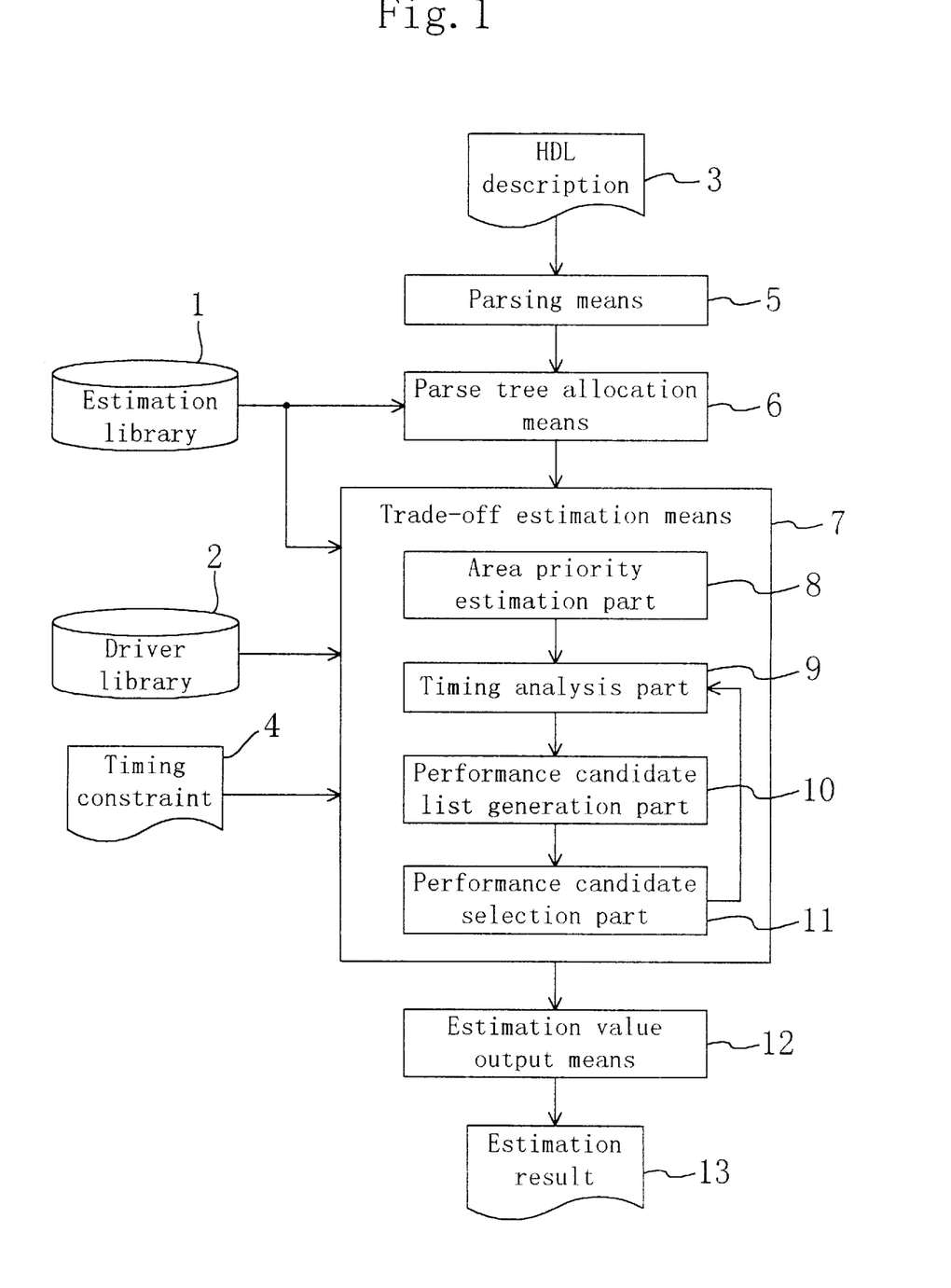
FIG. 1 is a block diagram for showing the structure of a performance estimation apparatus for an integrated circuit according to a first embodiment of the invention.

FIG. 1 is a functional block diagram of an apparatus for estimating a performance of an integrated circuit according to a first embodiment of the invention. In FIG. 1, a reference numeral 1 denotes an estimation library for storing estimation models for estimating the performances of composing elements, such as a register, an adder and a multiplier, of an integrated circuit at a register transfer level (hereinafter referred to as the "RTL"), a reference numeral 2 denotes a driver library for storing modeled relationships between a driving ability and an area of a driver for driving a line, a reference numeral 3 denotes a HDL description describing the integrated circuit at the RTL to be estimated for its performance, a reference numeral 4 denotes timing constraint for specifying a clock cycle of the integrated circuit to be estimated as a timing constraint, a reference numeral 5 denotes parsing means for receiving the HDL description 3 and converting the HDL description 3 into a representation using a parse tree, a reference numeral 6 denotes parse tree allocation means for allocating the elements of the estimation library 1 to respective nodes of the parse tree generated by the parsing means 5, and a reference numeral 7 denotes trade-off estimation means for estimating the area and timing of the integrated circuit to be estimated by using the driver library 2. The trade-off estimation means 7 includes an area priority estimation part 8 for estimating a minimum area of the integrated circuit to be estimated and a timing attained by the minimum area, a timing analysis part 9 for analyzing the estimated timing, a performance candidate list generation part 10 for enumerating performance candidates of the elements allocated by the parse tree allocation means 6, and a performance candidate selection part 11 for selecting, among the performance candidates of the elements generated by the performance candidate list generation part 10, a combination of the performance candidates which can satisfy the timing constraint 4 and can minimize the area. A reference numeral 12 denotes estimation value output means for outputting an estimation result 13.

Figure 2:
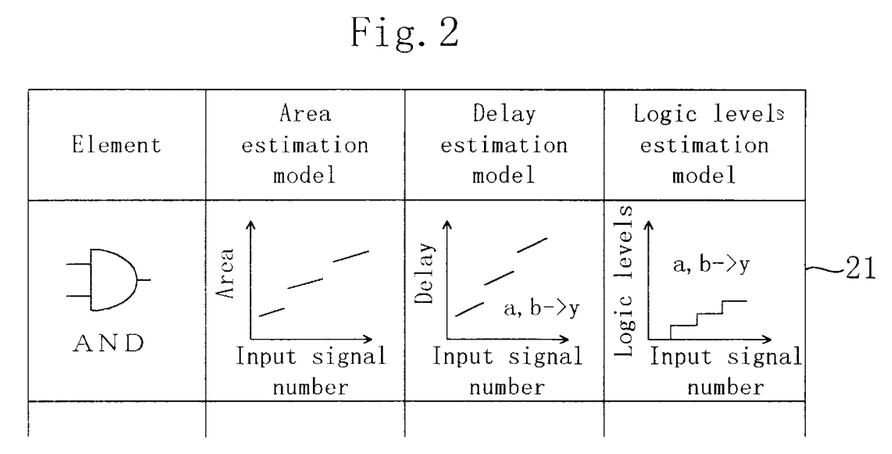
FIG. 2 is a diagram for showing information of an element of a type 1 stored in an estimation library in the performance estimation apparatus for an integrated circuit of the first embodiment.
Figure 3:
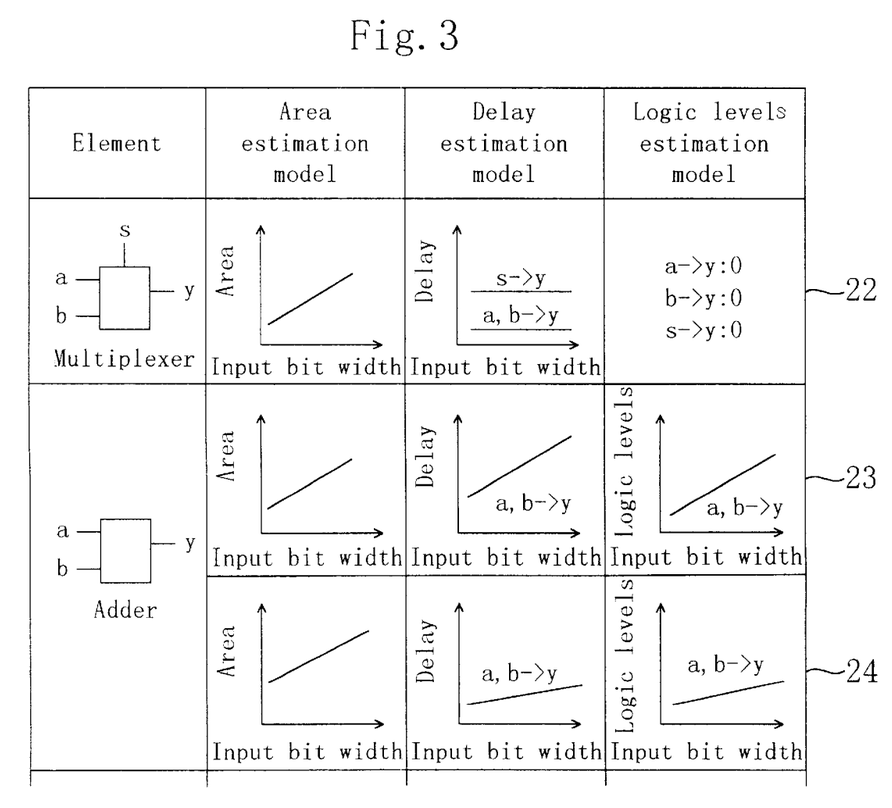
FIG. 3 is a diagram for showing information of elements of a type 2 stored in the estimation library in the performance estimation apparatus for an integrated circuit of the first embodiment.

FIGS. 2 and 3 are diagrams for showing information stored in the estimation library 1. The estimation library 1 stores estimation models used for estimating the performances of the elements representing the integrated circuit at the RTL, with the elements classified into two types. FIG. 2 is a diagram for showing the estimation models of elements of a type 1, namely, logical operation elements, such as an AND and an OR, adopted with a premise that the number of input signals is variable. FIG. 3 is a diagram for showing the estimation models of elements of a type 2, namely, other elements adopted with a premise that the number of input signals is fixed. As is shown in FIGS. 2 and 3, the estimation library 1 stores, with regard to each of the elements, an area estimation model corresponding to the area of the element, a delay estimation model corresponding to a gate delay time from the input to the output of the element, and a logic levels estimation model corresponding to the number of logic levels from the input to the output of the element used for obtaining a line delay time.

In FIG. 2, a row 21 corresponds to the models of an AND gate listed as an example of the elements of the type 1. As is shown in FIG. 2, the area estimation model, the delay estimation model and the logic levels estimation model of the element of the type 1 are respectively expressed by using a function of the number of input signals.

In FIG. 3, a row 22 corresponds to the models of a multiplexer and rows 23 and 24 correspond to the models of adders, listed as examples of the elements of the type 2. With regard to an element such as an adder which can be realized by any of several circuit configurations, the area estimation model, the delay estimation model and the logic levels estimation model of each circuit configuration are stored. The row 23 corresponds to the models of an adder realized by using a ripple carry with a small area, and the row 24 corresponds to the models of an adder realized by using a carry lookahead with a small delay time. As is shown in FIG. 3, the area estimation model, the delay estimation model and the logic levels estimation model of the element of the type 2 are respectively expressed by using a function of a bit width of the input signal. With regard to the multiplexer, the delay is expressed to be constant independently of the bit width in the delay estimation model, and the logic level is constantly 0 (zero) in the logic levels estimation model.

Figure 4:
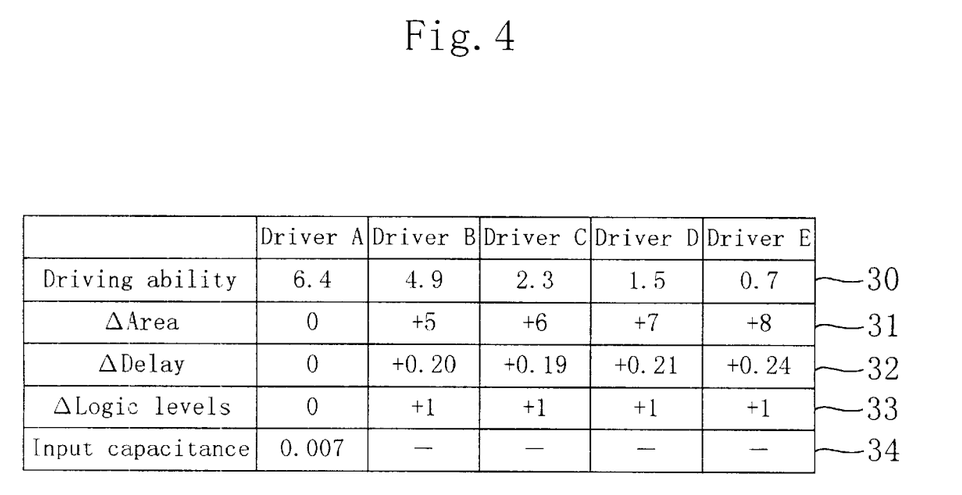
FIG. 4 is a diagram for showing information stored in a driver library in the performance estimation apparatus for an integrated circuit of the first embodiment.

FIG. 4 is a diagram for showing information stored in the driver library 2. In the driver library 2, drivers respectively having different driving abilities are modeled. Among drivers of FIG. 4, a driver A is a standard driver. In FIG. 4, a row 30 corresponds to a driving ability of each driver model expressed by a resistance value, and a smaller resistance value means a larger driving ability. Among the drivers listed in FIG. 4, the driving ability is increased from the driver A toward a driver E, specifically, the driver A has the smallest driving ability and the driver E has the largest driving ability. Also, a row 31 corresponds to an area of each driver model expressed by using a difference from the area of the driver A, a row 32 corresponds to a delay time of each driver model expressed by using a difference from the delay time of the driver A, a row 33 corresponds to logic levels of each driver model expressed by using a difference from logic levels of the driver A, and a row 34 corresponds to an input capacitance of each driver model expressed by using a difference from the input capacitance of the driver A. In this case, the input capacitance of the driver A is used as the input capacitance of each of the other driver models.

The estimation models of the respective elements stored in the estimation library 1 as is shown in FIGS. 2 and 3 are set on the basis of a cell library used in the design of the integrated circuit. Also, the driver models stored in the driver library 2 as is shown in FIG. 4 are set on the basis of the cell library.

Figure 5:
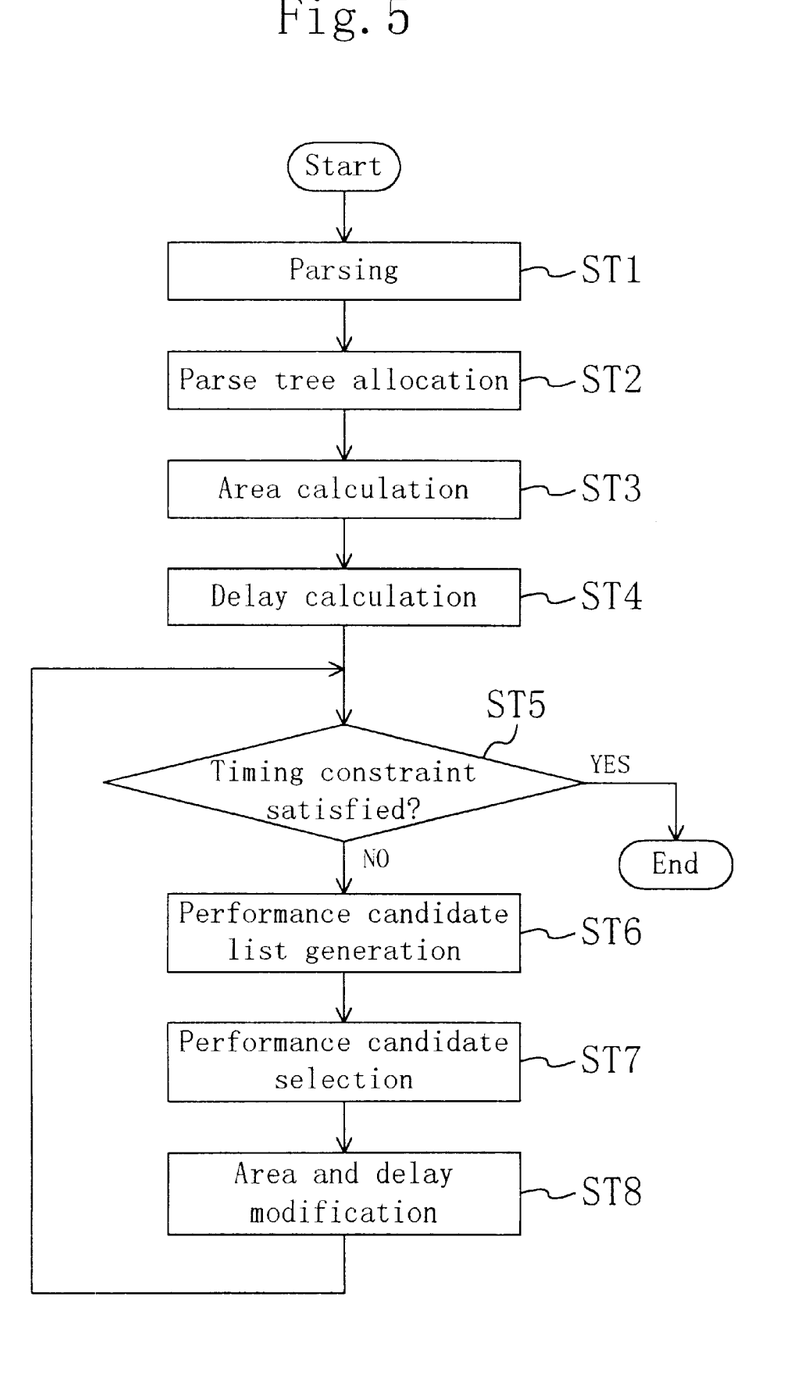
FIG. 5 is a flowchart for showing a performance estimation method by using the performance estimation apparatus for an integrated circuit of the first embodiment.

FIG. 5 is a flowchart of a method of estimating a performance of an integrated circuit according to the first embodiment. With reference to FIG. 5, the operation of the performance estimation apparatus for an integrated circuit of this embodiment will be described correspondingly to the structure shown in FIG. 1.

(Parsing step ST1)

As is shown in FIG. 5, first in a parsing step ST1, the parsing means 5 converts the received HDL description 3 into a representation using a parse tree and inputs the representation to the parse tree allocation means 6. The parsing step ST1 is carried out through a series of steps as follows:

(ST1-1) The HDL description 3 is divided into respective processes, and the following steps ST1-2 through ST1-5 are carried out on each process.

(ST1-2) The process is parsed, and a parse tree is generated.

(ST1-3) In the obtained parse tree, continuous ANDs (&) or ORs (|) are joined.

(ST1-4) In the obtained parse tree, a NOT (!) is joined with a child AND (&) or OR (|), thereby obtaining a NAND or NOR.

(ST1-5) In the resultant parse tree, a node is provided with the attribute of a bit width and a branch is provided with the attribute of a fan-out.

Figure 6A:
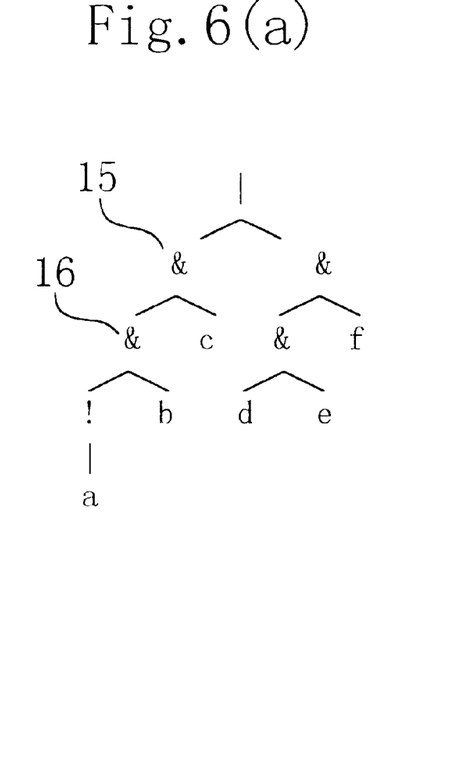
FIG. 6(a) is a diagram for showing an example of a parse tree obtained in a parsing step by the performance estimation apparatus for an integrated circuit of the first embodiment.
Figure 6B:
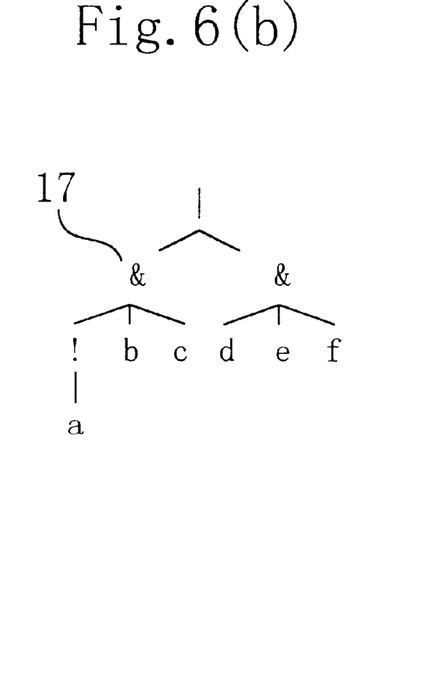
FIG. 6(b) is a diagram for showing a parse tree resulting from a join in the parsing step conducted on the parse tree of FIG. 6(a)

FIGS. 6(a) and 6(b) are diagrams for showing results of the parsing step ST1 conducted on the following expression of the HDL description:

X=!a&b&c|d&e&f

FIG. 6(a) is a diagram of a parse tree obtained by conducting the step ST1-2 on the above-described expression, and FIG. 6(b) is a diagram of a parse tree obtained by conducting the step ST1-3 on the parse tree of FIG. 6(a). ANDs (&) 15 and 16 of FIG. 6(a) are joined into an AND (&) 17 in FIG. 6(b).

(Parse tree allocating step ST2)

Next, in a parse tree allocating step ST2, the parse tree allocation means 6 allocates the elements stored in the estimation library 1 to respective nodes of the parse tree.

Figure 7:
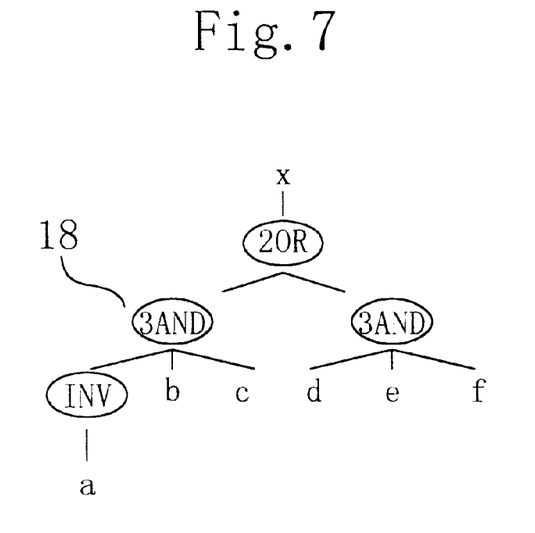
FIG. 7 is a diagram for showing an example of allocation obtained by parse tree allocation means in the performance estimation apparatus for an integrated circuit of the first embodiment.

FIG. 7 is a diagram for showing a result of the parse tree allocating step ST2 conducted on the parse tree of FIG. 6(b). In FIG. 7, 2OR, 3AND and INV respectively indicate a 2-input OR, a 3-input AND and an inverter, and a reference numeral 18 denotes a 3-input AND allocated to the AND (&) 17 of FIG. 6(b).

(Area calculating step ST3)

Next, in an area calculating step ST3, the area priority estimation part 8 of the trade-off estimation means 7 calculates a minimum area of the integrated circuit to be estimated. Specifically, the area of each element allocated by the parse tree allocation means 6 is obtained on the basis of its area estimation model, and the thus obtained areas of the respective elements are totaled, thereby obtaining the area of the integrated circuit to be estimated. With regard to an element of the type 1, an area per bit in accordance with the number of input signals is calculated on the basis of the area estimation model, and the obtained area per bit is multiplied by the attribute of the bit width set in the step ST1-5 of the parsing step ST1, thereby obtaining the area of the element. On the other hand, with regard to an element of the type 2, the area is calculated in accordance with the attribute of the bit width on the basis of the area estimation model. With regard to an element which can be realized by any of two or more circuit configurations, such as the adder shown in FIG. 3, the area is calculated by using the area estimation model of the circuit configuration having the minimum area.

(Delay calculating step ST4)

Next, in a delay calculating step ST4, the area priority estimation part 8 of the trade-off estimation means 7 calculates a delay time of each register-to-register path in the integrated circuit to be estimated with the minimized area. Specifically, the delay estimation model and the logic levels estimation model of each element allocated by the parse tree allocation means 6 and the driving ability and the input capacitance of the standard driver model (i.e., the driver A of FIG. 4) are used for calculating the delay time of each register-to-register path in the integrated circuit to be estimated.

Figure 8:
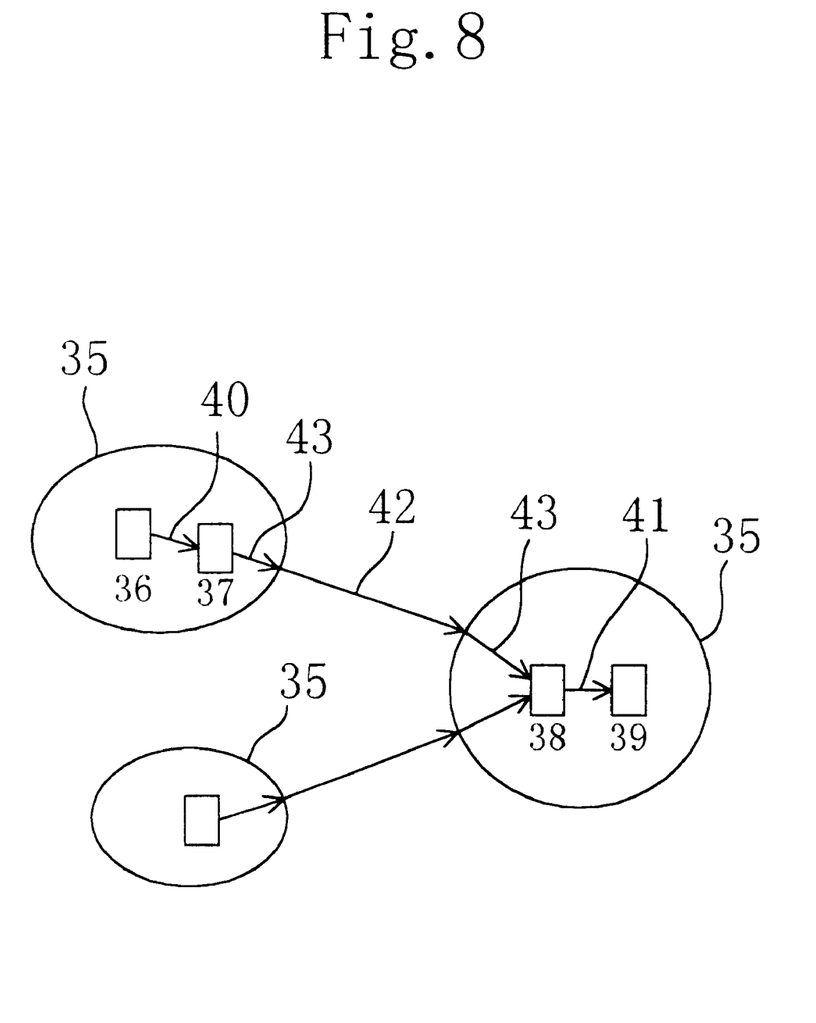
FIG. 8 is a diagram for showing a circuit representation in trade-off estimation means in the performance estimation apparatus for an integrated circuit of the first embodiment.

FIG. 8 is a diagram for showing an example of a circuit representation used by the trade-off estimation means 7. In FIG. 8, a reference numeral 35 denotes a parse tree, and reference numerals 36, 37, 38 and 39 denote the elements allocated by the parse tree allocation means 6, among which the reference numerals 36 and 39 denote registers and the reference numerals 37 and 38 denote the elements other than the registers. Also, reference numerals 40 and 41 denote branches of the parse trees, a reference numeral 42 denotes a connection between the parse trees, and a reference numeral 43 denotes an input/output branch of the parse tree. In FIG. 8, a path from the element 36 to the element 39 corresponds to a register-to-register path, and the delay time of this register-to-register path is calculated by totaling internal delay times of the elements 36, 37 and 38 on the path, the line delay times of the branches 40 and 41 between the elements and the line delay time of the connection 42 between the parse trees. No delay time is considered on the input/output branch 43 of the parse tree.

In the delay calculating step ST4, the delay time of the register-to-register path is obtained by using the circuit representation as is shown in FIG. 8 through a series of steps as follows:

(ST4-1) A gate delay time from the input to the output of each element is obtained on the basis of the delay estimation model.

(ST4-2) The line delay time within each element is obtained by the following formula (1):

$$\text{Line delay time within element} = \text{Driving ability of driver A} \times (\text{Input capacitance of driver A} + \text{Line capacitance}) \times (\text{Logic Levels from input to output of element}) \quad (1)$$

At this point, the line capacitance can be obtained on the basis of a virtual line length obtained by multiplying the circuit area obtained in the area calculating step ST3 by a constant value and a capacitance of a unit length, and the logic levels from the input to the output of the element can be obtained on the basis of the logic levels estimation model of the element.

(ST4-3) The internal delay time of the element is calculated by adding the gate delay time obtained in the step ST4-1 to the line delay time within the element obtained in the step ST4-2.

(ST4-4) A delay time from the start to the end of the parse tree is calculated by the following formula (4):

$$\text{Delay time from start to end of parse tree} = \Sigma(\text{Internal delay times of elements}) + \Sigma(\text{Driving ability of driver A} \times (\text{Input capacitance of driver A} + \text{Line capacitance})) \quad (2)$$

At this point, the second term of the formula (2) represents a sum of the line delay times between the elements, and the line capacitance in this term can be obtained on the basis of a virtual line length obtained by multiplying the circuit area obtained in the area calculating step ST3 by a constant value depending upon the attribute of the fan-out of a branch of the parse tree and a capacitance of a unit length.

(ST4-5) The delay time of the register-to-register path is calculated by using the following formula (3):

$$\text{Delay time of register-to-register path} = \Sigma(\text{Delay time from start to end of parse tree}) + \Sigma(\text{Driving ability of driver A} \times (\text{Input capacitance of driver A} + \text{Line capacitance})) \quad (3)$$

At this point, the second term of the formula (3) represents the sum of the line delay times between the parse trees, and the line capacitance in this term can be obtained in the same manner as the line capacitance of the formula (2).

(Analyzing step ST5)

Next, in an analyzing step ST5, the timing analysis part 9 of the trade-off estimation means 7 determines whether or not the delay time obtained by the area priority estimation part 8 satisfies the supplied timing constraint 4. When it is determined that the timing constraint 4 is satisfied, the estimation value output means 12 outputs the estimation result 13 describing the area and the delay time, and the procedure is completed. When it is determined that the time constraint 4 is not satisfied, information of a path, among critical paths not satisfying the constraint, having the largest delay time is output to the performance candidate list generation part 10, and the procedure proceeds to a subsequent step.

(Performance candidate list generating step ST6)

Next, in a performance candidate list generating step ST6, the performance candidate list generation part 10 of the trade-off estimation means 7 generates a performance candidate list. In the performance candidate list, performance candidates each represented by a group of {area, internal delay time, driving ability} are enumerated with regard to each element on the register-to-register path having the largest delay time. The performance candidate list is output to the performance candidate selection part 11. With regard to an element which can be realized by any of two or more circuit configurations such as the adder of FIG. 3, the estimated value of each circuit configuration is used as a performance candidate, and with regard to an element having the attribute of the fan-out of two or more, the performance candidate is obtained by applying each driver shown in FIG. 4.

Figure 9:
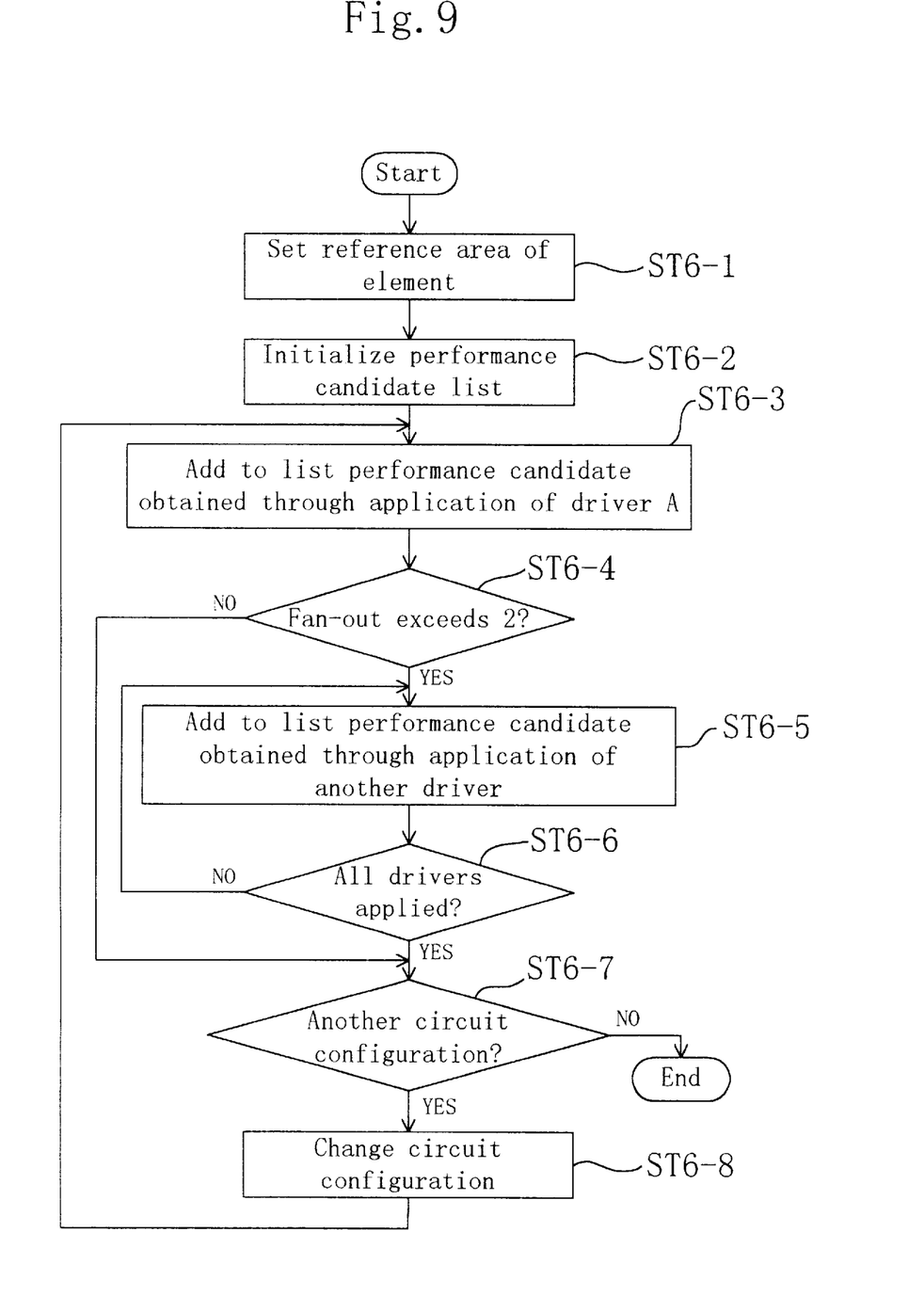
FIG. 9 is a flowchart for showing a performance candidate list generating step by using the performance estimation apparatus for an integrated circuit of the first embodiment.

FIG. 9 is a flowchart for showing the procedures for generating the performance candidate list of one element in the performance candidate list generating step ST6. With reference to FIG. 9, the procedures in the performance candidate list generating step ST6 will now be described.

First, in a step ST6-1, the area of this element obtained in the area calculating step ST3 is indicated as A0, and in a step ST6-2, the performance candidate list is initialized.

Then, in a step ST6-3, the area and the internal delay time are obtained by applying the driver A in the selected circuit configuration of the element, and a group of {a difference in the area from A0, the internal delay time, the driving ability of the driver A} is added to the performance candidate list. The internal delay time is obtained in the same manner as in the steps ST4-1 through ST4-3 in the delay calculating step ST4.

Next, in a step ST6-4, it is determined whether or not the attribute of the fan-out of the element is 2 or more, and when the fan-out does not exceed 2, namely, when the fan-out is 1, the procedure proceeds to a step ST6-7. When the fan-out exceeds 2, in steps ST6-5 and ST6-6, the area and the internal delay time are obtained by applying another driver, and a group of {a difference in the area from A0, the internal delay time, the driving ability of the selected driver} is added to the performance candidate list.

Then, in a step ST6-7, it is discriminated whether or not there is another circuit configuration for this element. When there is no circuit configuration, the procedure is completed, and when there is any, the circuit configuration is changed in a step ST6-8 and the procedure returns to the step ST6-3. The procedures following the step ST6-3 are repeatedly conducted until the performance candidates of all the circuit configurations of the element are obtained.

(Performance candidate selecting step ST7)

Next, in a performance candidate selecting step ST7, the performance candidate selection part 11 of the trade-off estimation means 7 selects one performance candidate from the performance candidate list of each element, so as to determine a combination of the performance candidates which can make the delay time of the register-to-register path satisfy the timing constraint 4 and can minimize the increase in the area of the integrated circuit to be estimated. The delay time of the path can be obtained in the same manner as in the steps ST4-4 through ST4-5 in the delay calculating step ST4, whereas the driving ability of the selected performance candidate is used in the calculation. (Area/delay modifying step ST8)

Furthermore, in an area/delay modifying step ST8, the performance selection part 11 modifies the area of the integrated circuit to be estimated and the delay times of all the paths passing through the elements whose performance candidates have been modified.

After the area/delay modifying step ST8, the timing analysis part 9 determines whether or not the delay times of the paths modified in the area/delay modifying step ST8 satisfy the timing constraint 4 in the analyzing step ST5. Thereafter, the aforementioned procedures are conducted.

In this manner, according to this embodiment, the trade-off estimation means 7 for obtaining the minimum area satisfying the timing constraint 4 is provided, so that the performance of the circuit attained by the logical design at the RTL can be accurately estimated. As a result, problems of the circuit can be overcome at the early stage of the design, thereby shortening the design time.

Furthermore, since the elements stored in the estimation library 1 have the delay estimation models and the logic levels estimation models, the gate delay time and the line delay time can be separately estimated. Accordingly, the line delay time can be accurately estimated in accordance with the area of the circuit.

Moreover, the elements stored in the estimation library 1 have the estimation models of several kinds of circuit configurations, and the performance candidate list generation part 10 is provided for generating the performance candidates with changing application of the driver models to an element having a large fan-out. Therefore, the performance of the circuit can be precisely estimated.

EMBODIMENT 2

Figure 10:
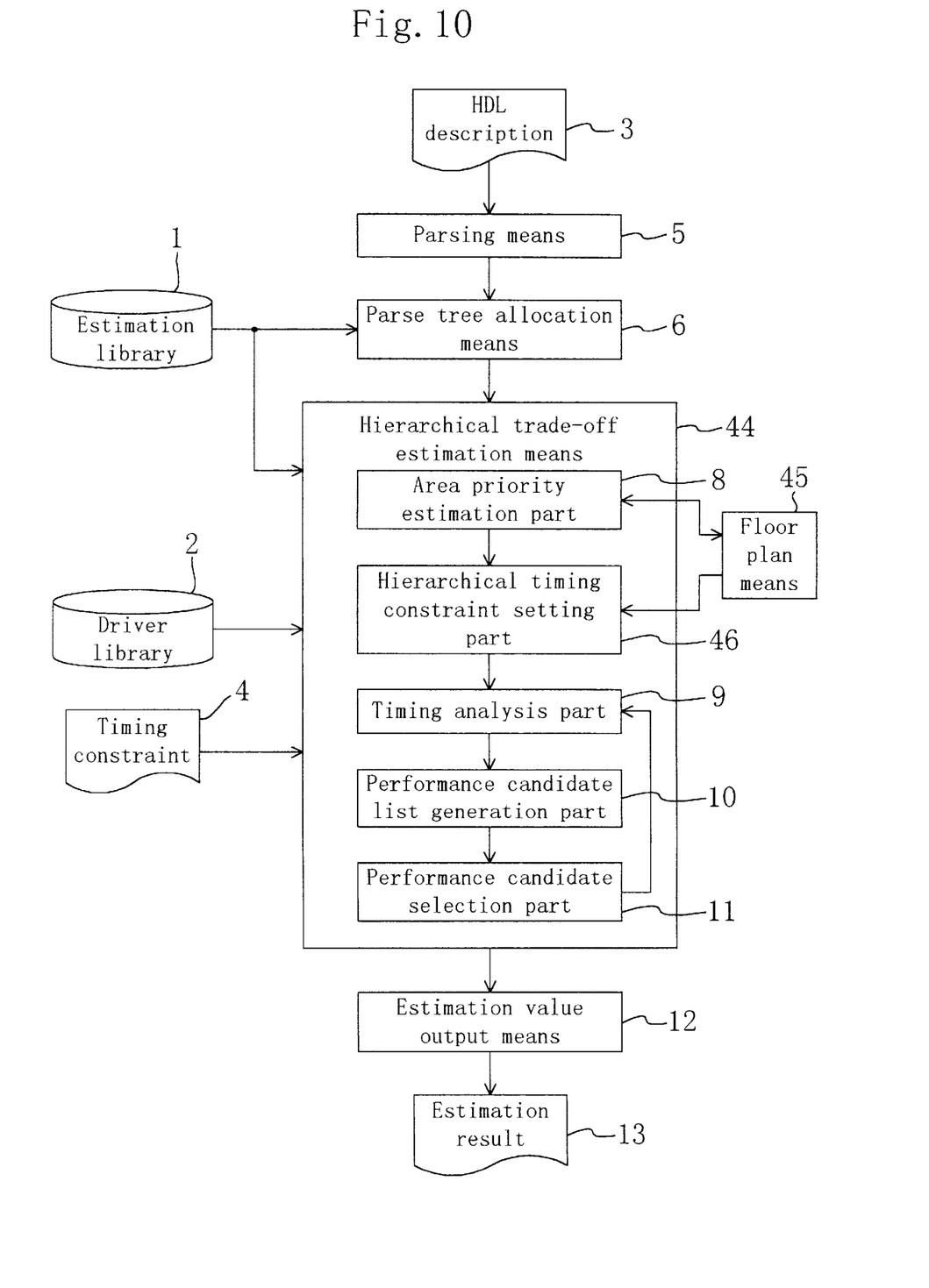
FIG. 10 is a block diagram for showing the structure of a performance estimation apparatus for an integrated circuit according to a second embodiment of the invention.

FIG. 10 is a functional block diagram of an apparatus for estimating a performance of an integrated circuit according to a second embodiment of the invention. In FIG. 10, a difference from the performance estimation apparatus of FIG. 1 is that hierarchical trade-off estimation means 44 and floor plan means 45 are provided for the purpose of estimating the performance of an integrated circuit with a hierarchical structure. Herein, a hierarchical unit in the hierarchical structure is designated as a module. In FIG. 10, like reference numerals are used to refer to like elements shown in FIG. 1 and the detailed description is omitted in this embodiment.

In FIG. 10, a reference numeral 44 denotes the hierarchical trade-off estimation means for estimating the area and the timing of an integrated circuit having a hierarchical structure by using a driver library 2. The hierarchical trade-of off estimation means 44 includes an area priority estimation part 8, a hierarchical timing constraint setting part 46 for setting a timing constraint of each hierarchy, a timing analysis part 9, a performance candidate list generation part 10 and a performance candidate selection part 11. Also, a reference numeral 45 denotes the floor plan means for determining, in an arbitrary hierarchy, placement of modules in a lower hierarchy and a rough line path for connecting the modules.

Figure 11:
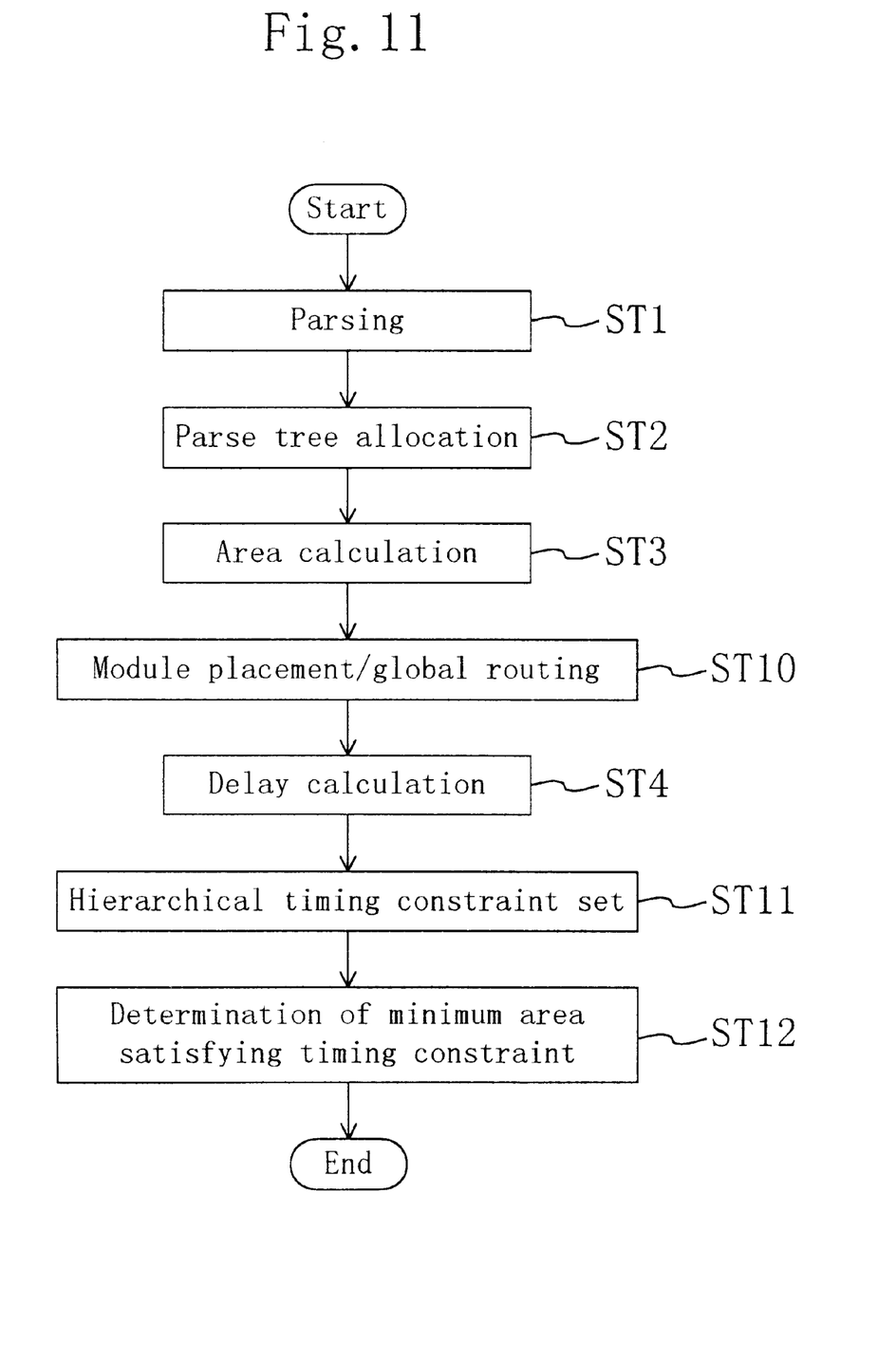
FIG. 11 is a flowchart for showing a performance estimation method by using the performance estimation apparatus for an integrated circuit of the second embodiment.

FIG. 11 is a flowchart for showing a method of estimating a performance of an integrated circuit according to the second embodiment. With reference to FIG. 11, the operation of the performance estimation apparatus for an integrated circuit of this embodiment will be described correspondingly to the structure shown in FIG. 10.

The operation of the parsing means 5 in the parsing step ST1, the operation of the parse tree allocation means 6 in the parse tree allocating step ST2 and the operation of the area priority estimation part 8 in the area calculating step ST3 are the same as those described in the first embodiment, whereas the area of the integrated circuit is estimated with regard to each hierarchy in the area calculating step ST3.

Figure 12:
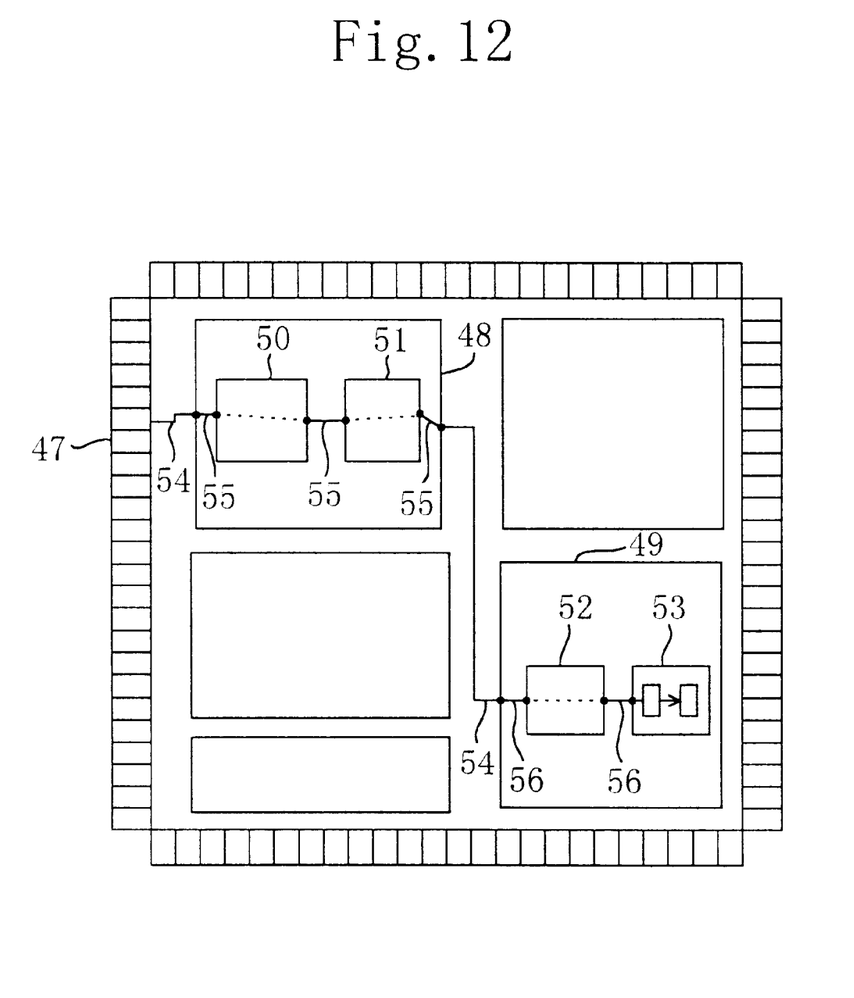
FIG. 12 is a diagram for showing a circuit representation in hierarchical trade-off estimation means in the performance estimation apparatus for an integrated circuit of the second embodiment.

FIG. 12 is a diagram of a circuit representation adopted in the hierarchical trade-off estimation means 44. When the uppermost hierarchy including the entire circuit is designated as a first hierarchy, in FIG. 12, reference numerals 48 and 49 denotes modules in a second hierarchy below the first hierarchy, reference numerals 50 and 51 denotes modules of a third hierarchy below the module 48 of the second hierarchy, reference numerals 52 and 53 denote modules in the third hierarchy below the module 49 of the second hierarchy, a reference numeral 54 denotes a connection in the first hierarchy, a reference numeral 55 denotes a connection in the module 48 of the second hierarchy, and a reference numeral 56 denotes a connection in the module 49 of the second hierarchy. Also, a reference numeral 47 denotes an I/O cell externally connected. However, in the case where an arbitrary hierarchy is represented, in the HDL description 3, not by using the structural representation but by using the functional representation, a module in this hierarchy is constructed by using plural parse trees as is shown in FIG. 8. Accordingly, a path from the I/O cell 47 through the respective hierarchies to a register of the module 53 is shown in FIG. 12, but the modules 50, 51 and 52 on this path can be provided with a further lower hierarchy or can be represented by using parse trees.

The area of each hierarchy obtained in the area calculating step ST3 is obtained as a sum of the areas of parse trees included in the hierarchy and the area of modules in a lower hierarchy. For example, in FIG. 12, the area of the module 48 is obtained as a sum of the areas of the modules 50 and 51 of the lower hierarchy.

(Module placing/global routing step ST10)

Next, in a module placing/rough routing step ST10, the floor plan means 45 determines, by using the areas of the respective modules obtained by the area priority estimation part 8, the placement of the modules in a lower hierarchy of an arbitrary hierarchy and a rough line path for connecting the modules. For example, in FIG. 12, the placement of the modules 48 and 49 of the first hierarchy is determined, and a rough line path between these modules, namely, the connection 54, is determined. On the basis of the line length obtained from the rough line path and a line capacitance per unit length, the line capacitance between the modules is calculated, so as to be input to the hierarchical timing constraint setting part 46.

Next, in a delay calculating step ST4, the area priority estimation part 8 calculates a delay time of each register-to-register path in the integrated circuit in the same manner as in the first embodiment. In this embodiment, however, on the basis of the placement of the modules and the path for connecting the modules in each hierarchy determined by the floor plan means 45, the line delay time between the modules is calculated, and by using the thus obtained line delay time, the delay time of the register-to-register path in each hierarchy is calculated.

(Hierarchical timing constraint setting step ST11)

Next, in a hierarchical timing constraint setting step ST11, the hierarchical timing constraint setting part 46 sets a timing constraint of each module on the basis of the timing constraint 4.

Figure 13:
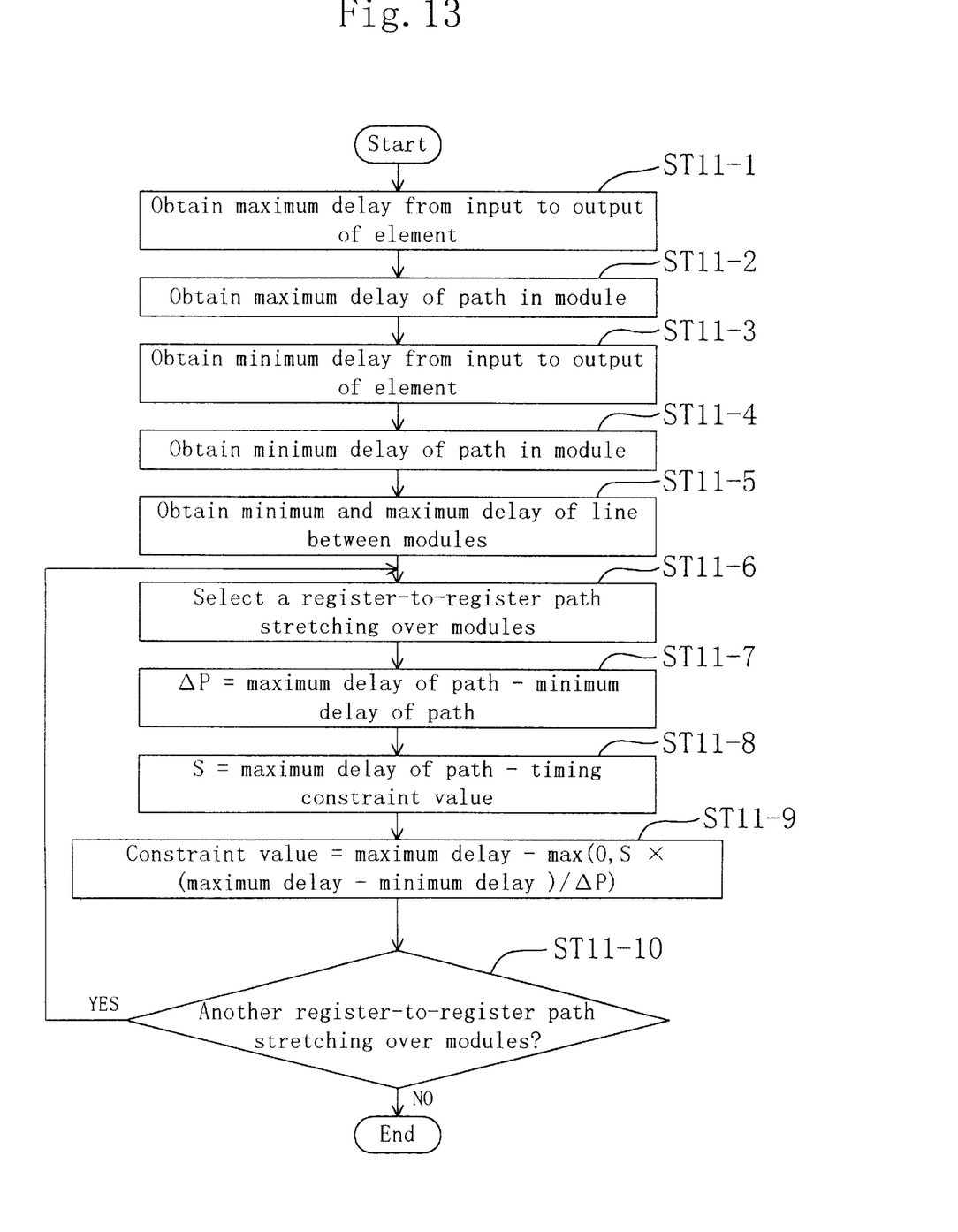
FIG. 13 is a flowchart for showing a hierarchical timing constraint setting step by using the performance estimation apparatus for an integrated circuit of the second embodiment.

FIG. 13 is a flowchart for showing the procedures in the hierarchical timing constraint setting step ST11.

First, in a step ST11-1, by using the delay estimation models of the elements stored in the estimation library 1, the maximum delay time from the input to the output of each element is obtained. At this point, with regard to an element which can be realized by any of plural circuit configurations, the circuit configuration having the maximum delay time is adopted, and the delay estimation model of this circuit configuration is used.

Next, in a step ST11-2, by applying the driver A of the driver library 2, the maximum delay time of each path in the module from the input to the output, from the input to a register, or from a register to the output is obtained. At this point, the calculation is performed in the same manner as in the delay calculating step ST4 of the first embodiment.

Then, in a step ST11-3, by using the delay estimation models of the elements stored in the estimation library 1, the minimum delay time from the input to the output of each element is obtained. At this point, with regard to an element which can be realized by any of plural circuit configurations, the circuit configuration having the minimum delay time is adopted, and the delay estimation model of this circuit configuration is used. With regard to an element realized by a single circuit configuration, the maximum delay time and the minimum delay time are equal.

Next, in a step ST11-4, the line delay time is obtained by applying the driver E having the largest driving ability to an element having the fan-out exceeding a constant N, and by applying the driver A to the other elements. The thus obtained line delay time is added to the minimum delay times of the respective elements, thereby obtaining the minimum delay time of each path in the module from the input to the output, from the input to the register or from the register to the output. At this point, when the internal delay times and the driving abilities of the driver A and the driver E are respectively indicated as Ia and Ie (Ia<Ie) and Da and De (Da>De), the constant N is defined as a fan-out corresponding to a line capacitance L obtained as:

$$Ia+L \times Da = Ie + L \times De$$

Then, in a step ST11-5, by using the line capacitance between the modules obtained in the module placing/global routing step ST10, the minimum delay time of the line between the modules is obtained on the basis of the driving ability of the driver E and the maximum delay time thereof is obtained on the basis of the driving ability of the driver A.

Next, in a step ST11-6, a register-to-register path extending between plural modules is selected. In a step ST11-7, a difference ΔP between the maximum delay time and the minimum delay time of the selected register-to-register path is calculated. In a step ST11-8, a difference S between the maximum delay time of the selected register-to-register path and a timing constraint value given from the timing constraint 4 is calculated.

Subsequently, in a step ST11-9, with regard to each path from the input to the register, from the register to the output or from the input to the output in each module on the selected register-to-register path, a constraint value is determined in accordance with the following formula (4) by using the maximum delay time obtained in the step ST11-2 and the minimum delay time obtained in the step ST11-4:

$$\text{Constraint value} = \text{maximum delay} - \max(0, S \times (\text{maximum delay} - \text{minimum delay})/\Delta P) \quad (4)$$

The formula (4) means that when the maximum delay time of a register-to-register path is smaller than the timing constraint value given from the timing constraint 4, the maximum delay time of the path is used as the constraint value.

(Timing constraint satisfying minimum area determining step ST12)

Then, in a timing constraint satisfying minimum area determining step ST12, on the basis of the timing constraint of each module, the timing analysis part 9, the performance candidate list generation part 10 and the performance candidate selection part 11 calculate the area and the delay time of each module in the same manner as in the first embodiment. The thus obtained result is output to the estimation value output means 12.

In this manner, since the floor plan means 45 is provided in this embodiment, the line delay time can be accurately calculated under consideration of a line path for connecting the modules. As a result, the performance of an integrated circuit having a hierarchical structure can be precisely estimated.

In the aforementioned embodiments, each estimation model stored in the estimation library 1 is represented by a function of the number of input signals or the input bit width, but the estimation model can be represented in another way. For example, it can be represented by using a group of an area, a delay time, the logic levels and the number of input signals or an input bit width, specifically, like (area, delay, logic levels, input signal number) or (area, delay, logic levels, input bit width). Furthermore, an existing cell library can be used as the estimation library 1.

In the aforementioned embodiments, the timing constraint 4 is given as a predetermined constraint, but when an area constraint is given together with or in stead of the timing constraint, the area and the timing of an integrated circuit can be estimated in the same manner.

In each of the aforementioned embodiments, the minimum area of an integrated circuit is obtained in the beginning of the trade-off estimation, namely, so-called area priority initialization is adopted. Instead, it is possible to adopt an initialization for attaining the maximum operation speed of the integrated circuit by applying a driver model having the largest driving ability. In this case, the application of the driver models is changed by the performance candidate selection part 11 so that the driving ability of an element on a path having a margin in the timing can be decreased. In this manner, the performance of an integrated circuit strictly constrained in the timing can be estimated in a shorter period of time than in the case where the area priority initialization is adopted.

In each of the aforementioned embodiments, the area and the timing of an integrated circuit are estimated, but it goes without saying that the other performances can be estimated. For example, the estimation library 1 can store, in addition to the area estimation models, the delay estimation models and the logic levels estimation models, models for estimating a charge amount moving in charging/discharging the element. Thus, power consumption in a normal operation can be estimated on the basis of an estimated operation speed and a supply voltage.

What is claimed is:

1. An apparatus for estimating a performance of an integrated circuit in design at a register transfer level, comprising:

an estimation library for storing estimation models used for estimating performances of respective elements representing said integrated circuit at the register transfer level;

a driver library for storing driver models of modeled relationships between driving abilities and areas of drivers for driving a line; and trade-off estimation means for estimating a performance of a target integrated circuit at the register transfer level represented by using connections between said elements which satisfies a predetermined constraint, by applying said estimation models stored in said estimation library to respective elements of said target integrated circuit and by changing application of said driver models stored in said driver library if necessary, wherein said trade-off estimation means includes:

an area priority estimation part for estimating a minimum area of said target integrated circuit and a delay time of each register-to-register path attained when said target integrated circuit has said minimum area;

a timing analysis part for determining whether or not delay time of each register-to-register path of said target integrated circuit satisfies a timing constraint given to said target integrated circuit;

a performance candidate list generation part for generating, with regard to each element on a register-to-register path whose delay time does not satisfy the timing constraint, a performance candidate list in which performance candidates are enumerated, by changing the application of said driver models; and a performance candidate selection part for selecting, with regard to each element on said register-to-register path, a performance candidate from said performance candidate list generated by said performance candidate list generation part so that the delay time of said register-to-register path satisfies the timing constraint and an increase in an area of said target integrated circuit is minimized, and for estimating the area of said target integrated circuit and the delay time of said register-to-register path attained by applying said selected performance candidate.

2. An apparatus for estimating a performance of an integrated circuit in design at a register transfer level, comprising:

an estimation library for storing estimation models used for estimating performances of respective elements representing said integrated circuit at the register transfer level;

a driver library for storing driver models of modeled relationships between driving abilities and areas of drivers for driving a line; and trade-off estimation means for estimating a performance of a target integrated circuit at the register transfer level represented by using connections between said elements which satisfies a predetermined constraint, by applying said estimation models stored in said estimation library to respective elements of said target integrated circuit and by changing application of said driver models stored in said driver library if necessary, wherein said target integrated circuit has a hierarchical structure, said apparatus further comprises floor plan means for determining placement of modules and line paths between said modules in each hierarchy of said target integrated circuit, and said trade-off estimation means predicts a performance of said target integrated circuit which satisfies a predetermined constraint in consideration of a line delay time between said modules estimated on the basis of said line paths determined by said floor plan means, wherein said trade-off estimation means includes:

an area priority estimation part for estimating a minimum area of said target integrated circuit and a delay time of each register-to-register path attained when said target integrated circuit has said minimum area, in each hierarchy;

a hierarchical timing constraint setting part for setting a timing constraint in each hierarchy on the basis of a timing constraint given to said target integrated circuit and the placement of said modules and said line paths between said modules in each hierarchy determined by said floor plan means;

a timing analysis part for determining whether or not delay time of each register-to-register path in each hierarchy of said target integrated circuit satisfies the timing constraint of the hierarchy set by said hierarchical timing constraint setting part;

a performance candidate list generation part for generating, with regard to each element on a register-to-register path in each hierarchy of said integrated circuit whose delay time does not satisfy the timing constraint of the hierarchy, a performance candidate list in which performance candidates are enumerated, by changing the application of said driver models; and a performance candidate selection part for selecting, with regard to each element on said register-to-register path, a performance candidate from said performance candidate list generated by said performance candidate list generation part so that the delay time of said register-to-register path satisfies the timing constraint of the hierarchy and an increase in the area of said target integrated circuit in the hierarchy is minimized, and for estimating the area of said target integrated circuit in the hierarchy and the delay time of said register-to-register path attained by applying said selected performance candidate.

3. A method of estimating a performance of an integrated circuit in design at a register transfer level, wherein estimation models for estimating performances of respective elements representing said integrated circuit at the register transfer level and driver models of modeled relationships between driving abilities and areas of drivers for driving a line are used, said method comprises a trade-off estimating step of estimating a performance of a target integrated circuit at the register transfer level represented by using connections between said elements which satisfies a predetermined constraint by applying said estimation models to respective elements of said target integrated circuit and by changing application of said driver models if necessary, and said trade-off estimating step includes:

a step of obtaining areas of respective elements of said target integrated circuit by using said estimation models and obtaining an area of said target integrated circuit on the basis of the areas of said respective elements;

a step of obtaining internal delay times of said respective elements and a line delay time of said target integrated circuit by using said estimation models and said driver models, and obtaining a delay time of each register-to-register path on the basis of the internal delay times of said elements and the line delay time; and a step of determining whether or not all register-to-register paths in said target integrated circuit satisfy a given timing constraint, and when the timing constraint is satisfied, estimating the obtained area as a minimum area, while when the timing constraint is not satisfied, with regard to each element on a register-to-register path whose delay time does not satisfy the timing constraint, obtaining a performance candidate for making said register-to-register path satisfy the timing constraint and minimizing an increase in an area of said target integrated circuit by changing the application of said driver models, and calculating the area of said target integrated circuit and the delay time of each register-to-register path attained by applying said obtained performance candidate.

4. A method of estimating a performance of an integrated circuit in design at a register transfer level, wherein estimation models for estimating performances of respective elements representing said integrated circuit at the register transfer level and driver models of modeled relationships between driving abilities and areas of drivers for driving a line are used, said method comprises a trade-off estimating step of estimating a performance of a target integrated circuit at the register transfer level represented by using connections between said elements which satisfies a predetermined constraint by applying said estimation models to respective elements of said target integrated circuit and by changing application of said driver models if necessary, said target integrated circuit has a hierarchical structure, said method further comprises a floor plan step of determining placement of modules and line paths between said modules in each hierarchy in said target integrated circuit, in said trade-off estimating step, a performance of said target integrated circuit which satisfies a predetermined constraint are estimated in consideration of a line delay time between said modules estimated on the basis of said line paths determined in said floor plan step, and said trade-off estimating step includes:

a step of obtaining areas of respective elements of said target integrated circuit by using said estimation models and obtaining an area of said target integrated circuit in each hierarchy on the basis of the areas of said respective elements;

a step of obtaining internal delay times of said respective elements and a line delay time of said target integrated circuit by using said estimation models and said driver models, obtaining a line delay time between said modules on the basis of the placement of said modules and said line path s between said modules in each hierarchy determined in said floor plan step, and obtaining a delay time of each register-to-register path on the basis of the respective delay times;

a step of setting a timing constraint of each hierarchy of said target integrated circuit on the basis of a timing constraint given to said target integrated circuit and the placement of said modules and said line paths between said modules in each hierarchy determined in said floor plan step; and a step of determining whether or not all register-to-register paths in said target integrated circuit satisfy the given timing constraint in each hierarchy, and when the timing constraint is satisfied, estimating the obtained area as a minimum area, while when the timing constraint is not satisfied, with regard to each element on a register-to-register path whose delay time does not satisfy the timing constraint, obtaining a performance candidate for making said register-to-register path satisfy the timing constraint and minimizing an increase in an area of said target integrated circuit in the hierarchy by changing the application of said driver models, and calculating the area of said target integrated circuit in the hierarchy and the delay time of each register-to-register path attained by applying said obtained performance candidate.

\* \* \* \* \*